United States Patent
Ajmera et al.

(10) Patent No.: US 10,055,332 B2
(45) Date of Patent: Aug. 21, 2018

(54) VARIABLE DETECTION IN SOURCE CODE TO REDUCE ERRORS

(71) Applicant: International Business Machines Corporation, Armonk, NY (US)

(72) Inventors: Jitendra Ajmera, Bangalore (IN); Ajay K. Gupta, New Delhi (IN); Harshit Kumar, Delhi (IN); Sachindra Joshi, Gurgagon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/042,259

(22) Filed: Feb. 12, 2016

(65) Prior Publication Data

US 2017/0235665 A1    Aug. 17, 2017

(51) Int. Cl.
*G06F 9/44* (2018.01)
*G06F 11/36* (2006.01)

(52) U.S. Cl.
CPC ................. *G06F 11/3624* (2013.01)

(58) Field of Classification Search
CPC .................................................. G06F 11/3624
USPC ......................................... 717/114, 123–129
See application file for complete search history.

(56) References Cited

U.S. PATENT DOCUMENTS

| | | | | |
|---|---|---|---|---|
| 5,293,629 A * | 3/1994 | Conley | ..................... | G06F 8/75 717/114 |
| 5,355,469 A | 10/1994 | Sparks et al. | | |
| 5,812,850 A * | 9/1998 | Wimble | ............... | G06F 11/3624 714/E11.209 |
| 5,857,070 A | 1/1999 | Satterfield et al. | | |
| 6,029,002 A * | 2/2000 | Afifi | ......... | G06F 8/433 714/E11.209 |
| 6,110,224 A * | 8/2000 | Kawabe | ............... | G06F 11/3604 714/E11.209 |
| 7,069,537 B2 * | 6/2006 | Lazarov | ................. | G06N 5/003 717/104 |
| 7,111,282 B2 * | 9/2006 | Stephenson | ......... | G06F 11/3612 714/E11.209 |
| 7,223,234 B2 * | 5/2007 | Stupp | ...................... | G06F 17/18 128/898 |
| 7,281,242 B2 * | 10/2007 | Inamdar | ................ | G06F 11/362 714/38.1 |
| 7,367,025 B1 * | 4/2008 | Nikolov | .............. | G06F 11/3624 714/E11.207 |
| 7,478,367 B2 | 1/2009 | Morgan et al. | | |
| 7,496,903 B2 * | 2/2009 | Rees | ................... | G06F 11/3612 717/124 |
| 7,818,729 B1 * | 10/2010 | Plum | ................... | G06F 11/3624 717/140 |

(Continued)

OTHER PUBLICATIONS

Amin et al, "An Analysis of Object Oriented Variability Implementation Mechanisms" ACM SIGSOFT Software Engineering Notes, vol. 36, No. 1, pp. 1-4, 2011.*

(Continued)

*Primary Examiner* — Anil Khatri
(74) *Attorney, Agent, or Firm* — Alexander G. Jochym

(57) ABSTRACT

Two or more variables in a source code are determined. One or more variable groupings for the two or more variables are determined. A potential error for a variable of the two or more variables is determined based on the determined variable groupings.

12 Claims, 3 Drawing Sheets

(56) References Cited

U.S. PATENT DOCUMENTS

| | | | |
|---|---|---|---|
| 7,849,446 B2* | 12/2010 | Lev | G06F 11/3632 |
| | | | 717/124 |
| 8,166,462 B2* | 4/2012 | Kosche | G06F 11/328 |
| | | | 717/125 |
| 8,181,158 B2* | 5/2012 | Lev | G06F 11/3612 |
| | | | 717/124 |
| 8,316,352 B2* | 11/2012 | Lev | G06F 11/362 |
| | | | 717/124 |
| 8,639,446 B1* | 1/2014 | Stupp | G06F 19/24 |
| | | | 702/19 |
| 8,732,668 B2* | 5/2014 | Klemenz | G06F 11/0793 |
| | | | 717/105 |
| 8,751,273 B2* | 6/2014 | Pinto | G06F 17/50 |
| | | | 705/7.11 |
| 8,997,058 B2* | 3/2015 | Bohnet | G06F 11/3612 |
| | | | 717/128 |
| 9,299,173 B2* | 3/2016 | Rope | G06T 11/206 |
| 9,355,155 B1* | 5/2016 | Cassel | G06F 21/552 |
| 9,652,227 B2* | 5/2017 | Chittimalli | G06F 8/73 |
| 2009/0100405 A1 | 4/2009 | Belenky et al. | |
| 2014/0351788 A1 | 11/2014 | Bienkowski et al. | |

OTHER PUBLICATIONS

Kamal et al, "Modeling the Variability of Architectural Patterns", ACM, pp. 2344-2351, 2010.*

Avidan et al, "Effects of Variable Names on Comprehension: An Emprical Study", IEEE, pp. 55-65, 2007.*

Surkan, "A Virtual-Variable N~-Specification Operator for High Level Languages", ACM, pp. 1-3, 1974.*

Song et al, "Generative Models for Name Disambiguation", ACM, pp. 1163-1164, 2007.*

Ju'arezMart et al, "Enfasis: A Model for Local Variable Crosscutting" ACM, pp. 261-265, 2008.*

Goto et al, "An Approach to Completing Variable Names for Implicitly Typed Functional Languages" ACM, pp. 131-140, 2012.*

Avgustinov et al, "A Comparison of Compilation Techniques for Trace Monitors With Free Variables", ACM, pp. 821-822, 2007.*

* cited by examiner

VARIABLE DETECTION IN SOURCE CODE TO REDUCE ERRORS

BACKGROUND

The present invention relates generally to the field of bug determination, and more particularly to the determination of logical errors.

In computing, source code is any collection of computer instructions written using some human-readable computer language. Generally, the source code is text. The source code may be transformed by a compiler program into low-level machine code that then can be understood by a computer.

In computer programming, a declaration specifies properties of an identifier: it declares what a word means. The declarations are most commonly used for functions, variables, constants, and classes, but can also be used for other entities such as enumerations and type definitions. Incorrect declarations may lead to a logic error. A logic error is a bug in a computer program that causes it to operate incorrectly, but not to terminate abnormally. A logic error produces unintended or undesired output or other behavior, although it may not be immediately recognized as such.

SUMMARY OF THE INVENTION

Embodiments of the present invention include a method, computer program product, and system for determining potential associate errors. In one embodiment, two or more variables in a source code are determined. One or more variable groupings for the two or more variables are determined. A potential error for a variable of the two or more variables is determined based on the determined variable groupings.

DETAILED DESCRIPTION OF THE PREFERRED EMBODIMENTS

Embodiments of the present invention provide for checking variable declarations in source code. Embodiments of the present invention provide for receiving a source code that includes a plurality of variables. Embodiments of the present invention provide for determining variables in the source code. Embodiments of the present invention provide for determining variable grouping of variables in the source code. Embodiments of the present invention provide for determining potential errors in the source code. Embodiments of the present invention provide reporting determined potential errors to a user or another program.

Embodiments of the present invention recognize that generally a set of variables are used together (i.e., a variable grouping). Embodiments of the present invention recognize that using a variable from a different variable grouping can cause errors in the source code (e.g., associated logical errors). Embodiments of the present invention recognize that using variables from different variables groupings can occur frequently due to simple copy and paste functions. Embodiments of the present invention recognize that it is hard to visually detect errors due to similar code structures and similar variable naming.

Figure 1:
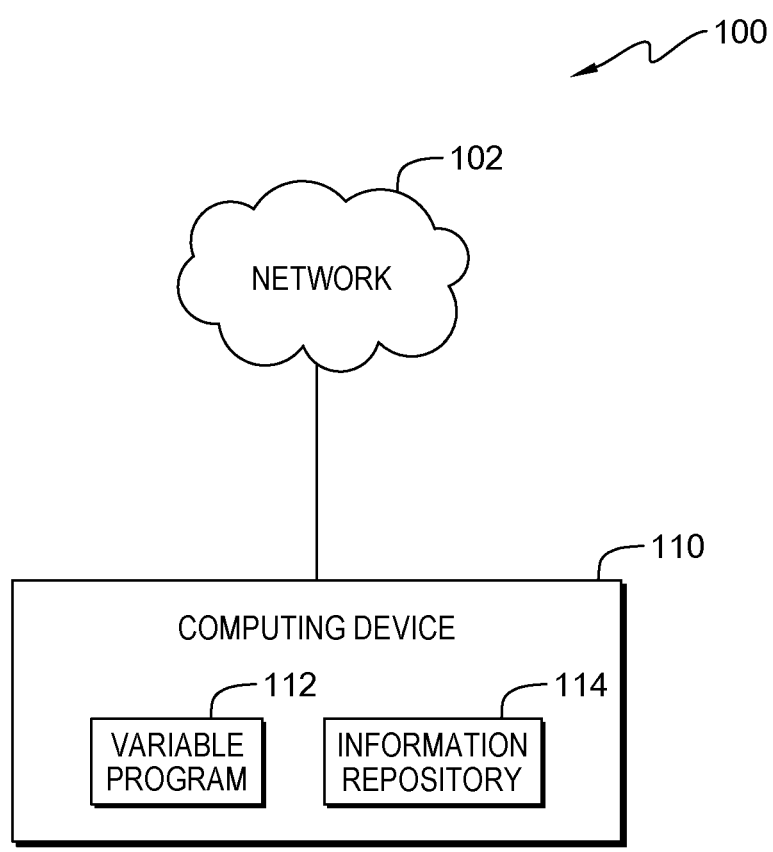
FIG. 1 depicts a functional block diagram of a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments can be implemented. Many modifications to the depicted embodiment can be made by those skilled in the art without departing from the scope of the invention as recited by the claims.

An embodiment of data processing environment 100 includes computing device 110 interconnected over network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between computing device 110 and any other computer connected to network 102, in accordance with embodiments of the present invention.

In an embodiment, computing device 110 may be a laptop, tablet, or netbook personal computer (PC), a desktop computer, a personal digital assistant (PDA), a smart phone, camera, video camera, video device or any programmable electronic device capable of communicating with any computing device within data processing environment 100. In certain embodiments, computing device 110 collectively represents a computer system utilizing clustered computers and components (e.g., database server computers, application server computers, etc.) that act as a single pool of seamless resources when accessed by elements of data processing environment 100, such as in a cloud computing environment. In general, computing device 110 is representative of any electronic device or combination of electronic devices capable of executing computer readable program instructions. In an embodiment, computing device 110 may include components as depicted and described in detail with respect to FIG. 3, in accordance with embodiments of the present invention.

In an embodiment, computing device 110 includes variable program 112 and information repository 114. In an embodiment, variable program 112 is a program, application, or subprogram of a larger program that checks variable declarations in source code. In an alternative embodiment, variable program 112 may be located on any other device accessible by computing device 110 via network 102. In an embodiment, information repository 114 may include source code, lexical information, name pattern information of variables, filter information of usage patterns of variables, grouping information of variables, and rules about mixing variable usage across groups of variables. In an alternative embodiment, information repository 114 may be located on any other device accessible by computing device 110 via network 102.

In an embodiment, variable program 112 may receive source code for analysis. In an embodiment, variable program 112 may determine variables that are found in the source code or a section of the source code. In an embodiment, variable program 112 may determine variable grouping of the variables found in the source code previously. In an embodiment, variable program 112 may determine variable grouping based on either name pattern information of variables, filter information of usage patterns of variables, or both. In an embodiment, variable program 112 may determine potential errors in the variables found in the source code using rules about mixing variable usage across groups of variables. In an embodiment, variable program 112 may report potential errors determined previously to a user or another program.

In an embodiment, computing device 110 includes information repository 114. In an embodiment, information repository 114 may include source code. In an embodiment, the source code is the source code that will be analyzed by variable program 112. In an embodiment, information repository 114 may include one or more pieces of source code. In an embodiment, information repository 114 may include source code that is being worked on by another program (i.e. compiler or programming software). In an embodiment, information repository 114 may include lexical information related to lexical analysis and lexical parsing. In an embodiment, lexical information may include tokens, lexical grammar, tokenization information, etc. In an embodiment, information repository 114 may include information about name patterns of variables. In an embodiment, the information about name patterns may be predefined variable groupings created by a user or created by a program and verified by a user. In an embodiment, the information about name patterns that is predefined may be specific to a programming language or a generalized name pattern that is applicable multiple programming languages. In an embodiment, information repository 114 may include filter information of usage patterns of variables. In an embodiment, the filter information may include information related to variables that are used together (i.e. usage patterns) or in the same groups of variables (i.e., detected group variables). In an embodiment, information repository 114 may include grouping information of variables. In an embodiment, grouping information of variables may be predefined variable groupings created by a user or created by a program and verified by a user. In an embodiment, information repository 114 may include rules about mixing variable usage across groups of variables. In an embodiment, the rules may include information related to what type of rules indicate when a potential error is found in a variable(s) of a group of variables. In other words, when a variable declaration is improper.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Figure 2:
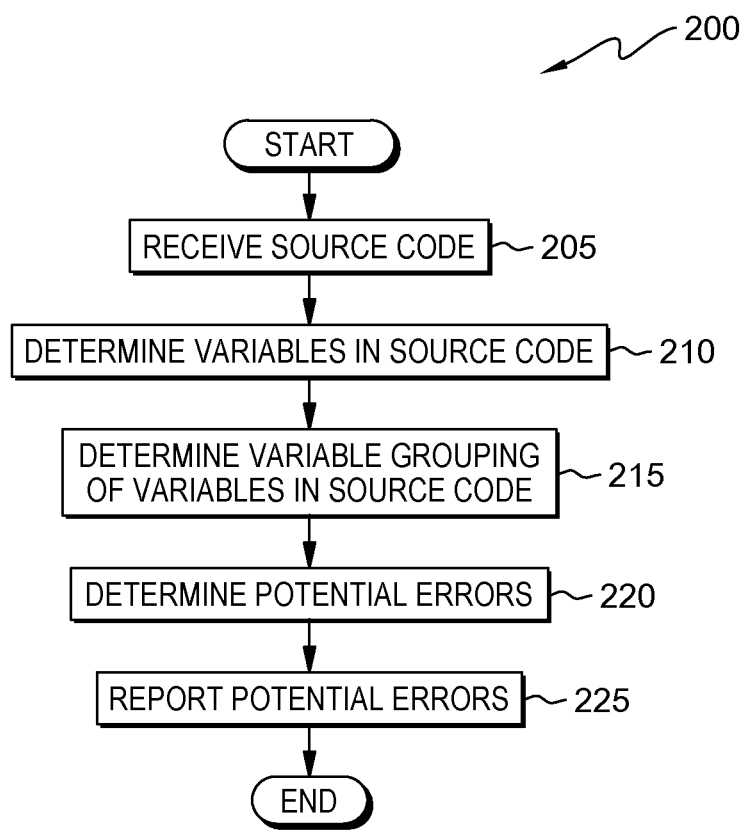
FIG. 2 depicts a flowchart of operational steps of a program for checking variable declarations in source code, in accordance with an embodiment of the present invention.

FIG. 2 is a flowchart of workflow 200 depicting operational steps for checking variable declarations in source code, in accordance with an embodiment of the present invention. In one embodiment, the steps of workflow 200 are performed by variable program 112. In an alternative embodiment, steps of the workflow can be performed by any other program while working with variable program 112. In a preferred embodiment, a user, via a user interface, can invoke workflow 200 upon determining that the user would like to check the variable declarations in a piece of source code. In an alternative embodiment, a program (not shown), such as a compiler, can invoke workflow 200 upon determining that a source code file needs to have the variable declarations in the source code file checked.

Variable program 112 receives source code (step 205). In other words, variable program 112 receives an indication of source code that has variable declarations for checking. In an embodiment, variable program 112 may receive an indication from a user or another program of source code stored in information repository 114. In an alternative embodiment, variable program 112 may receive source code directly from a user or another program and variable program 112 may store the source code in information repository 114. In an embodiment, variable program 112 may receive an indication from a user or another program that all, some, parts or pieces of the source code should be analyzed.

Variable program 112 determines variables in the source code (step 210). In other words, variable program 112 uses a lexical analysis tool along with a parser generator to determine the variables that are found in the source code received previously. In an embodiment, the lexical analysis tool and parser generator are integrated with variable program 112. In an alternative embodiment, the lexical analysis tool along with the parser generator are a separate program or programs that can analyze the source code and indicate to variable program 112 the variables found in the source code. In an embodiment, the lexical analysis tool performs the process of converting a sequence of characters in the source code into a sequence of tokens (i.e., strings with an identified meaning). In an embodiment, this lexical analysis tool is combined with the parser generator which may together, or separately, analyze the syntax of the source code to determine the variables found in the source code. In an embodiment, the analyzing the syntax of the source code to determine the variables found in the source code can be done using the sequence of tokens.

Variable program 112 determines variable grouping of variables in the source code (step 215). In other words, variable program 112 determines variable grouping of variables that were previously determined (step 210) in the source code. In an embodiment, variable program 112 may determine variable grouping based on name patterns of the determined variables in the source code. In an embodiment, variable program 112 may analyze the variables and determine similarities between naming conventions of the variables. Based on the similarities in the naming convention, variable program 112 determines groupings of variables so as to group variables with similar naming conventions. In an embodiment, grouping such as edit distance may be used. For example, the similarity between the variable covered_u and covered_y could be 0.95 (95%) while the similarity between the variable covered_u and vertex_u could be 0.10 (10%).

In an embodiment, variable program 112 may filter the variable grouping based upon the usage patterns of variables. In other words, a first variable may be put in a variable grouping because a second variable found in the variable grouping has similar usage patterns as the first variable. In an embodiment, variable program 112 may filter the variable grouping based upon the similarity of known variable groupings. In other words, a first variable may be put in a variable grouping because the first variable is similar to a second variable and the second variable is already found in the variable grouping. For example, is variable A is similar to variable B and variable B is in Group B then variable A will be placed in Group B.

Variable program 112 determines potential errors (step 220). In other words, variable program 112 determines potential errors using the determined variables, the determined variable groupings, and rules for determining potential errors. In an embodiment, the rules for determining potential errors may include information related to variables that must be grouped together, variables that must not be grouped together, variables that must be included in a variable grouping if another variable is already found in that variable grouping, variables that must not be included in a variable grouping if another variable is already found in that variable grouping, etc. For example, if a basic block contains a variable $v\_i$ that is determined to be in variable grouping $g\_l$. Additionally, another variable $v\_j$ is determined to be in other variable groupings but not variable grouping $g\_l$. Finally, there is another variable $v\_k$ that is determined to be in variable grouping $g\_l$ and variable $v\_k$ is similar to variable $v\_j$. Therefore, variable program 112 determines that variable $v\_j$ is a potential error because variable $v\_j$ is not in variable grouping $g\_l$.

Variable program 112 reports potential errors (step 225). In other words, variable program 112 notifies a user or another program of potential errors determined previously. For example, variable program 112 reports to a user that variable $v\_j$ in the previous example is a potential error. In an embodiment, variable program 112 may suggest alternative variable declarations. For example, variable program 112 may suggest replacing $v\_j$ with $v\_k$ in the previous example. Here, $v\_k$ belongs to variable grouping $g\_l$ so $v\_k$ should have been used with the other variables variable grouping $g\_l$, while $v\_j$ does not belong to variable grouping $g\_l$, and therefore, variable program 112 may suggest replacing $v\_j$ with $v\_k$ in variable grouping $g\_l$.

Figure 3:
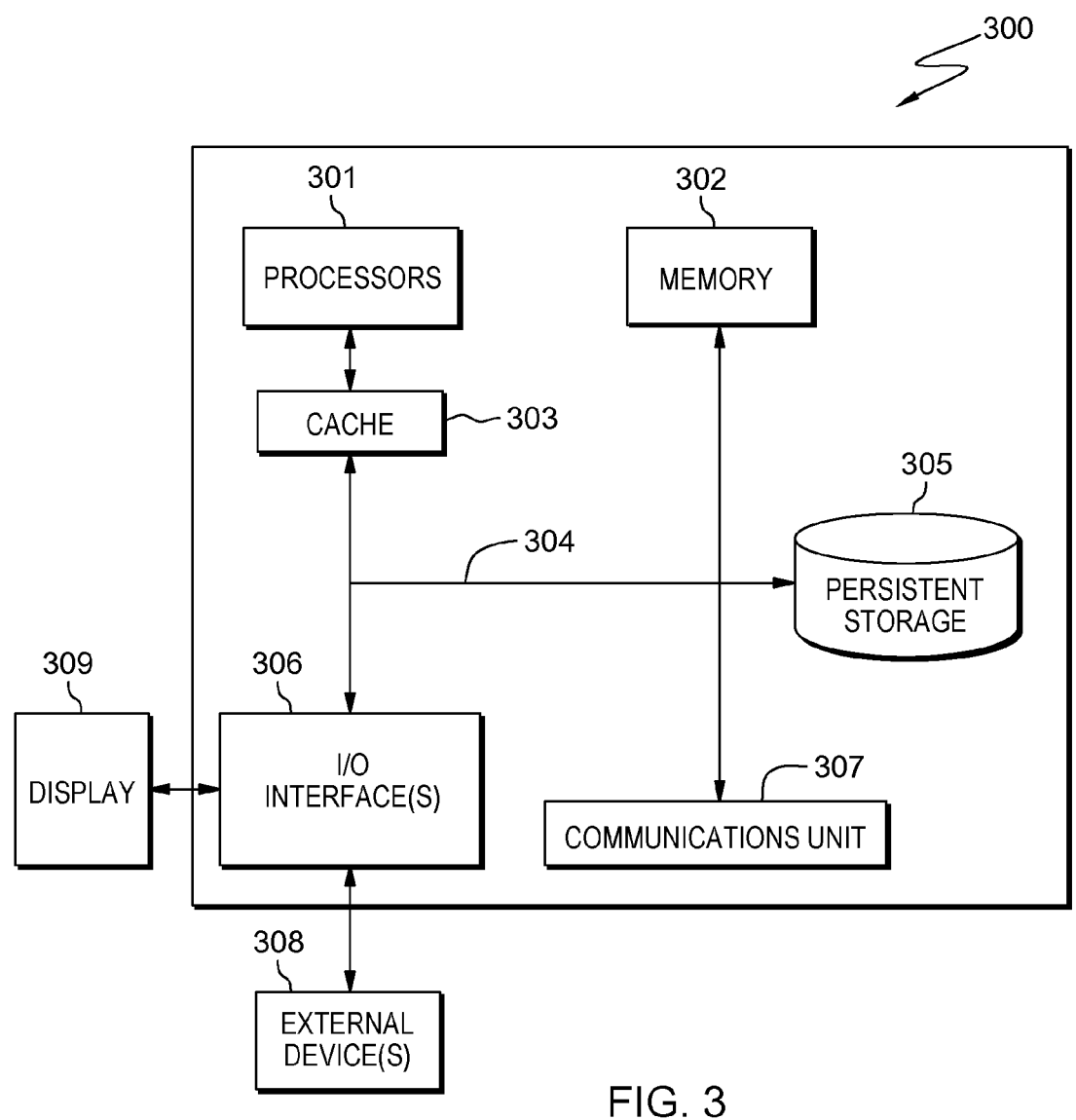
FIG. 3 depicts a block diagram of components of the computer of FIG. 1, in accordance with an embodiment of the present invention.

FIG. 3 depicts computer system 300 that is an example of a system that includes variable program 112. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for determining potential associate errors, the method comprising the steps of:
    determining, by one or more computer processors, two or more variables in a source code;
    determining, by one or more computer processors, one or more variable groupings for the two or more variables based on a naming pattern information of each variable of the two or more variables and a usage pattern of each variable of the two or more variables;
    determining, by one or more computer processors, a first variable of the two or more variables, wherein the first variable belongs to a first variable grouping of the one or more variable groupings;
    determining, by one or more computer processors, a second variable of the two or more variables;
    determining, by one or more computer processors, a set of rules, wherein the rules include one or more of the following: a first plurality of groups of variables that must be grouped together, a second plurality of groups of variables that must not be grouped together, a first plurality of variables that must be included in a group that includes a second plurality of variables, and a third plurality of variables that must not be included in a group that includes a fourth plurality of variables; and
    determining, by one or more computer processors, whether second variable should be included in the first variable grouping based on one or more of the following: the set of rules and the first variable; and responsive to determining the second variable should not be included in the first variable grouping, determining, by one or more computer processors, a potential error for the second variable.

2. The method of claim 1, further comprising:
providing, by one or more computer processors, an indication to a user based on whether the second variable should be included in the first variable grouping.

3. The method of claim 2, wherein the step of providing, by one or more computer processors, an indication to a user based on whether the second variable should be included in the first variable grouping comprise:
determining, by one or more computer processors, that the second variable should be included in the first variable grouping based on the set of rules and the first variable;
responsive to determining that the second variable should be included in the first variable grouping based on the set of rules and the first variable, providing, by one or more computer processors, an indication to a user that the second variable should be included in the first variable grouping.

4. The method of claim 2, wherein the step of providing, by one or more computer processors, an indication to a user based on whether the second variable should be included in the first variable grouping comprise:
determining, by one or more computer processors, that the second variable should not be included in the first variable grouping based on the set of rules and the first variable;
responsive to determining that the second variable should not be included in the first variable grouping based on the set of rules and the first variable, providing, by one or more computer processors, an indication to a user that the second variable should not be included in the first variable grouping.

5. A computer program product for determining potential associate errors, the computer program product comprising:
one or more computer readable storage media; and
program instructions stored on the one or more computer readable storage media, the program instructions comprising:
program instructions to determine two or more variables in a source code;
program instructions to determine one or more variable groupings for the two or more variables based on a naming pattern information of each variable of the two or more variables and a usage pattern of each variable of the two or more variables;
program instructions to determine a first variable of the two or more variables, wherein the first variable belongs to a first variable grouping of the one or more variable groupings;
program instructions to determine a second variable of the two or more variables;
program instructions to determine a set of rules, wherein the rules include one or more of the following: a first plurality of groups of variables that must be grouped together, a second plurality of groups of variables that must not be grouped together, a first plurality of variables that must be included in a group that includes a second plurality of variables, and a third plurality of variables that must not be included in a group that includes a fourth plurality of variables; and
program instructions to determine whether second variable should be included in the first variable grouping based on one or more of the following: the set of rules and the first variable; and
program instructions, responsive to determining the second variable should not be included in the first variable grouping, to determine a potential error for the second variable.

6. The computer program product of claim 5, further comprising program instructions, stored on the one or more computer readable storage media, to:
provide an indication to a user based on whether the second variable should be included in the first variable grouping.

7. The computer program product of claim 6, wherein the program instructions to provide an indication to a user based on whether the second variable should be included in the first variable grouping comprise:
program instructions to determine that the second variable should be included in the first variable grouping based on the set of rules and the first variable;
program instructions, responsive to determining that the second variable should be included in the first variable grouping based on the set of rules and the first variable, to provide an indication to a user that the second variable should be included in the first variable grouping.

8. The computer program product of claim 6, wherein the program instructions to provide an indication to a user based on whether the second variable should be included in the first variable grouping comprise:
program instructions to determine that the second variable should not be included in the first variable grouping based on the set of rules and the first variable;
program instructions, responsive to determining that the second variable should not be included in the first variable grouping based on the set of rules and the first variable, to provide an indication to a user that the second variable should not be included in the first variable grouping.

9. A computer system for determining potential associate errors, the computer system comprising:
one or more computer processors;
one or more computer readable storage media; and
program instructions stored on the one or more computer readable storage media for execution by at least one of the one or more computer processors, the program instructions comprising:
program instructions to determine two or more variables in a source code;
program instructions to determine one or more variable groupings for the two or more variables based on a naming pattern information of each variable of the two or more variables and a usage pattern of each variable of the two or more variables;
program instructions to determine a first variable of the two or more variables, wherein the first variable belongs to a first variable grouping of the one or more variable groupings;
program instructions to determine a second variable of the two or more variables;
program instructions to determine a set of rules, wherein the rules include one or more of the following: a first plurality of groups of variables that must be grouped together, a second plurality of groups of variables that must not be grouped together, a first plurality of variables that must be included in a group that includes a second plurality of variables, and a third plurality of variables that must not be included in a group that includes a fourth plurality of variables; and program instructions to determine whether second variable should be included in the first variable grouping based on one or more of the following: the set of rules and the first variable; and program instructions, responsive to determining the second variable should not be included in the first variable grouping, to determine a potential error for the second variable.

10. The computer system of claim 9, further comprising program instructions, stored on the one or more computer readable storage media for execution by at least one of the one or more computer processors, to:

provide an indication to a user based on whether the second variable should be included in the first variable grouping.

11. The computer system of claim 10, wherein the program instructions to provide an indication to a user based on whether the second variable should be included in the first variable grouping comprise:

program instructions to determine that the second variable should be included in the first variable grouping based on the set of rules and the first variable;

program instructions, responsive to determining that the second variable should be included in the first variable grouping based on the set of rules and the first variable, to provide an indication to a user that the second variable should be included in the first variable grouping.

12. The computer system of claim 10, wherein the program instructions to provide an indication to a user based on whether the second variable should be included in the first variable grouping comprise:

program instructions to determine that the second variable should not be included in the first variable grouping based on the set of rules and the first variable;

program instructions, responsive to determining that the second variable should not be included in the first variable grouping based on the set of rules and the first variable, to provide an indication to a user that the second variable should not be included in the first variable grouping.

\* \* \* \* \*